Patented Nov. 19, 1929

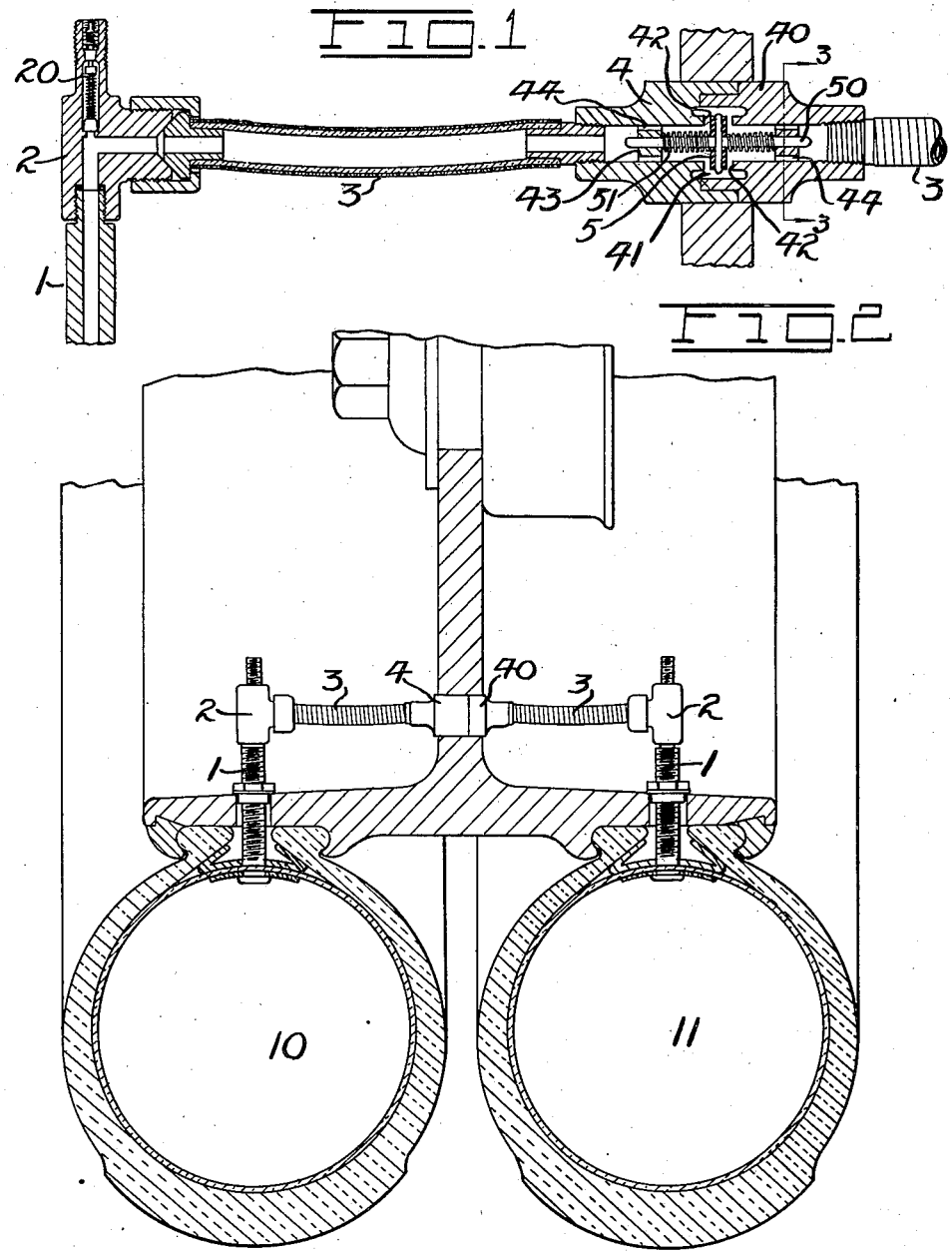

1,736,191

UNITED STATES PATENT OFFICE

WILFRID L. DUNDIN AND EDWIN S. STEHL, OF SEATTLE, WASHINGTON, ASSIGNORS OF ONE-THIRD TO FRANK E. REYNOLDS, ONE-THIRD TO SAID DUNDIN, AND ONE-THIRD TO SAID STEHL, ALL OF SEATTLE, WASHINGTON

CROSS AIR CONNECTION FOR TWIN TIRES

Application filed June 14, 1928. Serial No. 285,270.

Our invention relates to a means for connecting the tubes of twin tires so that both may be inflated together and the same pressure will be maintained in each, and yet the two will be automatically disconnected by a puncture or blow-out in one so that will not cause deflation of the other.

The invention consists in placing a double-acting valve in a cross connection between the tires, and in providing springs yieldable under a rush of air, to normally hold said valve unseated, so that the valve will be seated when a blow-out occurs in either tire.

In the accompanying drawings we have shown one form of construction which is approved by us, by which the desired result may be obtained.

Figure 1 is a longitudinal central section through the valve and its connection with the tires.

Figure 2 shows by a cross section through the tires and rim the manner of mounting it in relation to twin tires.

Figure 3 is a section on the plane indicated by the broken lines 3—3 of Figure 1.

From the standpoint of convenience in inflating and evenness of action, it is desirable that both of twin tires have an air connection which will maintain a like pressure in each. Such a connection if permanent is objectionable when one tire is punctured, as this deflates both tires. To prevent puncture or blow-out of one tire from deflating the other, we employ the following or an equivalent mechanism:

From the valve tube 1 of each tire tube we remove the valve and connect these tubes by a cross connection which has therein a double facing valve or valves normally unseated but seating in one direction by such a rush of air as would occur when one tire is punctured or blows out.

Immediately connected with each tire valve tube 1 is a T-type fitting 2, having in one opening the usual tire valve fitting 20. The third opening, which faces toward the wheel center, is adapted in any suitable manner to be connected with a tube 3, which tubes from both tires 10 and 11 connect with the safety or shut-off valve. The construction of this latter valve may be widely varied. It should provide a normally open passage between the two tires and should be automatically closed by a rush of air from either tire to the other, as would be caused by a blow-out in either tire. The construction of valve shown is as follows:

The valve casing is in two parts 4 and 40, joining at the valve chamber, as by screwing together. The valve chamber 41 has two oppositely facing seats 42, and in the chamber 41 is a disk valve 5, normally held displaced from both seats but yieldable upon slight urging, to seat upon either seat 42. As illustrated, the valve 5 has a stem 50 extending each way therefrom and slidable in bearings 43 provided in the channel of the valve casing. Springs 51 of slight strength prevent seating of the valve under such flow of air as would occur when inflating, but yield to permit seating upon a blow-out occurring in either tire. The point at which the valve 5 will be seated may be determined by varying the strength of the springs 51.

By the use of such a device as the above the pressures in both tires will be maintained alike, while if a blow-out occurs in one tire, the other tire will not be deflated.

Should the rush of air caused by inflation of a tire be sufficient to cause the safety valve to close, it will be necessary to supply air to the other or companion tire to secure equality of pressures and unseating of the safety valve.

What we claim as our invention is:

1. A pressure equalizing device for twin tires comprising a valve case formed of two sections joined together and hollowed to form a valve receiving chamber between them, said chamber having two oppositely facing seats said casing being adapted to be connected at opposite sides of said valve seats with the respective tires, a double seated valve adapted to seat one face upon one valve seat and its other face upon the other valve seat, and springs normally holding said valve away from both seats to permit free flow of air past it but yieldable under a sudden rush of air to be seated upon either valve seat.

2. A pressure retaining valve for connecting twin tires, comprising a casing formed of two hollowed sections joined together to form a central chamber having therein two oppositely facing valve seats, a valve mounted between said seats to be seated upon either, springs normally holding said valve off of both seats, and means freely connecting said valve casing outwardly from said valve seats with the respective tires.

Signed at Seattle, King County, Washington, this 7th day of June, 1928.

WILFRID L. DUNDIN.
EDWIN S. STEHL.